US007899913B2

(12) United States Patent
Minami et al.

(10) Patent No.: US 7,899,913 B2
(45) Date of Patent: Mar. 1, 2011

(54) CONNECTION MANAGEMENT SYSTEM AND METHOD FOR A TRANSPORT OFFLOAD ENGINE

(75) Inventors: John Shigeto Minami, Honolulu, HI (US); Michael Ward Johnson, Livermore, CA (US); Robin Yasu Uyeshiro, Kailua, HI (US)

(73) Assignee: NVIDIA Corporation, Santa Clara, CA (US)

( * ) Notice: Subject to any disclaimer, the term of this patent is extended or adjusted under 35 U.S.C. 154(b) by 1683 days.

(21) Appl. No.: 10/742,358

(22) Filed: Dec. 19, 2003

(65) Prior Publication Data

US 2005/0138180 A1 Jun. 23, 2005

(51) Int. Cl.
*G06F 15/173* (2006.01)
*G06F 15/16* (2006.01)
(52) U.S. Cl. .......................................... 709/227; 709/223
(58) Field of Classification Search .................. 709/223, 709/227
See application file for complete search history.

(56) References Cited

U.S. PATENT DOCUMENTS

| 4,807,111 | A | 2/1989 | Cohen et al. ................. 364/200 |
| 4,839,851 | A | 6/1989 | Maki ............................ 364/900 |
| 5,012,489 | A | 4/1991 | Burton et al. ..................... 375/8 |
| 5,056,058 | A | 10/1991 | Hirata et al. .................. 364/900 |
| 5,161,193 | A | 11/1992 | Lampson et al. ................ 380/49 |
| 5,163,131 | A | 11/1992 | Row et al. ..................... 395/200 |
| 5,307,413 | A | 4/1994 | Denzer ........................... 380/49 |
| 5,426,694 | A | 6/1995 | Herbert ......................... 379/242 |
| 5,430,727 | A | 7/1995 | Callon ........................ 370/85.13 |
| 5,440,551 | A | 8/1995 | Suzuki ............................ 370/60 |
| 5,455,599 | A | 10/1995 | Cabral et al. .................. 345/133 |
| 5,485,460 | A | 1/1996 | Schrier et al. ................ 370/94.1 |
| 5,495,480 | A | 2/1996 | Yoshida .......................... 370/60 |
| 5,499,353 | A | 3/1996 | Kadlec et al. ................. 395/445 |
| 5,513,324 | A | 4/1996 | Dolin, Jr. et al. ......... 395/200.18 |
| 5,519,704 | A | 5/1996 | Farinacci et al. .......... 370/85.13 |
| 5,544,357 | A | 8/1996 | Huei ............................. 395/600 |
| 5,546,453 | A | 8/1996 | Herbert ......................... 379/242 |
| 5,566,170 | A | 10/1996 | Bakke et al. ..................... 370/60 |
| 5,577,105 | A | 11/1996 | Baum et al. ..................... 379/93 |
| 5,577,172 | A | 11/1996 | Vatland et al. ................ 395/114 |
| 5,577,237 | A | 11/1996 | Lin ............................... 395/555 |
| 5,581,686 | A | 12/1996 | Koppolu et al. ............... 395/340 |
| 5,596,702 | A | 1/1997 | Stucka et al. ................. 395/340 |
| 5,598,410 | A | 1/1997 | Stone ........................... 370/469 |
| 5,619,650 | A | 4/1997 | Bach et al. ............... 395/200.01 |
| 5,621,434 | A | 4/1997 | Marsh ........................... 345/145 |

(Continued)

FOREIGN PATENT DOCUMENTS

WO    WO 98/21655    5/1998

(Continued)

OTHER PUBLICATIONS

Unknown, "Proceedings of the BSDCon 2002 Conference" USENIX Association, Feb. 11-14, 2002, XP-002320713.

(Continued)

*Primary Examiner* — Ario Etienne
*Assistant Examiner* — Avi Gold
(74) *Attorney, Agent, or Firm* — Zilka-Kotab, PC

(57) ABSTRACT

A system and method are provided for establishing network connections. Initially, an attempt to establish a connection on a network is identified. A portion of memory is then allocated for storing data associated with the connection.

19 Claims, 10 Drawing Sheets

U.S. PATENT DOCUMENTS

| | | | |
|---|---|---|---|
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,675,507 A | 10/1997 | Bobo, II | 364/514 |
| 5,678,060 A | 10/1997 | Yokoyama et al. | 395/831 |
| 5,680,605 A | 10/1997 | Torres | 395/603 |
| 5,687,314 A | 11/1997 | Osman et al. | 395/200 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,761,281 A | 6/1998 | Baum et al. | 379/93.29 |
| 5,778,178 A | 7/1998 | Arunachalam | 395/200.33 |
| 5,790,546 A | 8/1998 | Dobbins et al. | 370/400 |
| 5,790,676 A | 8/1998 | Ganesan et al. | 380/23 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,049,857 A | 4/2000 | Watkins | 711/207 |
| 6,061,368 A | 5/2000 | Hitzelberger | 370/537 |
| 6,061,742 A | 5/2000 | Stewart et al. | 709/250 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,122,670 A | 9/2000 | Bennet et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden | 713/201 |
| 6,185,619 B1 | 2/2001 | Joffe et al. | 709/229 |
| 6,208,651 B1 | 3/2001 | Van Renesse et al. | 370/392 |
| 6,226,680 B1 | 5/2001 | Boucher | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher | 709/238 |
| 6,247,068 B1 | 6/2001 | Kyle | 709/328 |
| 6,327,625 B1 | 12/2001 | Wang et al. | 709/235 |
| 6,330,659 B1 | 12/2001 | Poff et al. | 712/34 |
| 6,334,153 B2 | 12/2001 | Boucher | 709/230 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,389,479 B1 | 5/2002 | Boucher | 709/243 |
| 6,389,537 B1 | 5/2002 | Davis et al. | 713/187 |
| 6,393,487 B2 | 5/2002 | Boucher | 709/238 |
| 6,397,316 B2 | 5/2002 | Fesas, Jr. | 711/200 |
| 6,427,169 B1 | 7/2002 | Elzur | 709/224 |
| 6,427,171 B1 | 7/2002 | Craft | 709/230 |
| 6,427,173 B1 | 7/2002 | Boucher | 709/238 |
| 6,430,628 B1 | 8/2002 | Conner | 710/5 |
| 6,434,620 B1 | 8/2002 | Boucher | 709/230 |
| 6,460,080 B1 | 10/2002 | Shah et al. | 709/224 |
| 6,470,415 B1 | 10/2002 | Starr | 711/104 |
| 6,530,061 B1 | 3/2003 | Labatte | 714/807 |
| 6,591,302 B2 | 7/2003 | Boucher | 709/230 |
| 6,609,225 B1 | 8/2003 | Ng | 714/781 |
| 6,629,141 B2 | 9/2003 | Elzur et al. | 709/224 |
| 6,658,480 B2 | 12/2003 | Boucher | 709/239 |
| 6,687,758 B2 | 2/2004 | Craft | 709/250 |
| 6,697,868 B2 | 2/2004 | Craft | 709/230 |
| 6,751,665 B2 | 6/2004 | Philbrick | 709/224 |
| 6,757,746 B2 | 6/2004 | Boucher | 709/250 |
| 6,807,581 B1 | 10/2004 | Starr | 709/250 |
| 6,938,092 B2 | 8/2005 | Burns | 709/230 |
| 6,941,386 B2 | 9/2005 | Craft | 709/250 |
| 6,965,941 B2 | 11/2005 | Boucher | 709/230 |
| 6,996,070 B2 | 2/2006 | Starr | 370/252 |
| 7,039,717 B2 | 5/2006 | Johnson | |
| 7,042,898 B2 | 5/2006 | Blightman | 370/463 |
| 7,313,623 B2 * | 12/2007 | Elzur et al. | 709/227 |
| 2001/0004354 A1 | 6/2001 | Jolitz | |
| 2001/0021949 A1 | 9/2001 | Blightman | 709/219 |
| 2001/0023460 A1 | 9/2001 | Boucher | 709/250 |
| 2001/0027496 A1 | 10/2001 | Boucher | 709/250 |
| 2001/0036196 A1 | 11/2001 | Blightman | 370/465 |
| 2001/0037397 A1 | 11/2001 | Boucher | 709/230 |
| 2001/0037406 A1 | 11/2001 | Philbrick | 709/250 |
| 2001/0047433 A1 | 11/2001 | Boucher | 709/250 |
| 2002/0055993 A1 | 5/2002 | Shah et al. | 709/223 |
| 2002/0085562 A1 | 7/2002 | Hufferd et al. | 370/392 |
| 2002/0087732 A1 | 7/2002 | Boucher | 709/250 |
| 2002/0091844 A1 | 7/2002 | Craft | 709/230 |
| 2002/0095519 A1 | 7/2002 | Philbrick | 709/250 |
| 2002/0120899 A1 | 8/2002 | Gahan et al. | 714/748 |
| 2002/0147839 A1 | 10/2002 | Boucher | 709/238 |
| 2002/0156927 A1 | 10/2002 | Boucher | 709/250 |
| 2002/0161919 A1 | 10/2002 | Boucher | 709/238 |
| 2002/0163888 A1 | 11/2002 | Grinfeld | 370/235 |
| 2003/0005142 A1 | 1/2003 | Elzur et al. | 709/232 |
| 2003/0005143 A1 | 1/2003 | Elzur et al. | 709/232 |
| 2003/0014544 A1 | 1/2003 | Pettey | 709/249 |
| 2003/0016669 A1 | 1/2003 | Pfister et al. | 370/392 |
| 2003/0031172 A1 | 2/2003 | Grinfeld | 370/389 |
| 2003/0046330 A1 | 3/2003 | Hayes | 709/201 |
| 2003/0046418 A1 | 3/2003 | Raval et al. | 709/237 |
| 2003/0056009 A1 | 3/2003 | Mizrachi et al. | 709/245 |
| 2003/0058870 A1 | 3/2003 | Mizrachi et al. | 370/395.52 |
| 2003/0061505 A1 | 3/2003 | Sperry et al. | 713/200 |
| 2003/0066011 A1 | 4/2003 | Oren | 714/758 |
| 2003/0079033 A1 | 4/2003 | Craft | 709/230 |
| 2003/0084185 A1 | 5/2003 | Pinkerton | |
| 2003/0095567 A1 | 5/2003 | Lo et al. | 370/466 |
| 2003/0115350 A1 | 6/2003 | Uzrad-Nali et al. | 709/231 |
| 2003/0115417 A1 | 6/2003 | Corrigan | 711/118 |
| 2003/0128704 A1 | 7/2003 | Mizrachi et al. | 370/394 |
| 2003/0140124 A1 | 7/2003 | Burns | 709/220 |
| 2003/0145101 A1 | 7/2003 | Mitchell et al. | 709/236 |
| 2003/0145270 A1 | 7/2003 | Holt | 714/766 |
| 2003/0167346 A1 | 9/2003 | Craft | 709/250 |
| 2003/0200284 A1 | 10/2003 | Philbrick | 709/219 |
| 2004/0003126 A1 | 1/2004 | Boucher | 709/250 |
| 2004/0042412 A1 * | 3/2004 | Fan | 370/252 |
| 2004/0054813 A1 | 3/2004 | Boucher | 709/250 |

| | | | | |
|---|---|---|---|---|
| 2004/0062245 A1* | 4/2004 | Sharp et al. | ........................ | 370/392 |
| 2004/0062246 A1 | 4/2004 | Boucher | ........................ | 370/392 |
| 2004/0064578 A1 | 4/2004 | Boucher | ........................ | 709/236 |
| 2004/0064589 A1 | 4/2004 | Boucher | ........................ | 709/250 |
| 2004/0064590 A1 | 4/2004 | Starr | ........................ | 709/250 |
| 2004/0073703 A1 | 4/2004 | Boucher | ........................ | 709/245 |
| 2004/0078462 A1 | 4/2004 | Philbrick | ........................ | 709/224 |
| 2004/0088262 A1 | 5/2004 | Boucher | ........................ | 705/65 |
| 2004/0100952 A1 | 5/2004 | Boucher | ........................ | 370/389 |
| 2004/0111535 A1 | 6/2004 | Boucher | ........................ | 709/250 |
| 2004/0117509 A1 | 6/2004 | Craft | ........................ | 709/250 |
| 2004/0158640 A1 | 8/2004 | Philbrick | ........................ | 709/230 |
| 2004/0158793 A1 | 8/2004 | Blightman | ........................ | 714/758 |
| 2004/0240435 A1 | 12/2004 | Boucher | ........................ | 370/352 |
| 2005/0066028 A1* | 3/2005 | Illikkal et al. | ........................ | 709/224 |
| 2005/0122986 A1 | 6/2005 | Starr | ........................ | 370/412 |
| 2005/0141561 A1 | 6/2005 | Craft | ........................ | 370/474 |
| 2005/0160139 A1 | 7/2005 | Boucher | ........................ | 709/203 |
| 2005/0175003 A1 | 8/2005 | Craft | ........................ | 370/389 |
| 2005/0182841 A1 | 8/2005 | Sharp | ........................ | 709/228 |
| 2005/0198198 A1 | 9/2005 | Craft | ........................ | 709/217 |
| 2005/0204058 A1 | 9/2005 | Philbrick | ........................ | 709/238 |
| 2005/0278459 A1 | 12/2005 | Boucher | ........................ | 709/250 |
| 2006/0010238 A1 | 1/2006 | Craft | ........................ | 709/227 |
| 2007/0062245 A1 | 3/2007 | Fuller et al. | ........................ | 72/413 |

FOREIGN PATENT DOCUMENTS

| | | |
|---|---|---|
| WO | WO 98/50852 | 11/1998 |
| WO | WO 99/65219 | 12/1999 |
| WO | WO0013091 | 3/2000 |
| WO | 0113583 A2 | 2/2001 |
| WO | WO 01/13583 | 2/2001 |
| WO | WO 01/28179 | 4/2001 |
| WO | WO 02/39302 | 5/2002 |
| WO | WO 02/059757 | 8/2002 |
| WO | WO 02/086674 | 10/2002 |
| WO | WO 03/021443 | 3/2003 |
| WO | WO 03/021447 | 3/2003 |
| WO | WO 03/021452 | 3/2003 |
| WO | 03/105011 | 12/2003 |
| WO | WO 03/105011 | 12/2003 |

OTHER PUBLICATIONS

European Search Report from corresponding European application 04030035.2-2413 that was mailed on Mar. 23, 2005.

Office Action from European application No. 04030035.2-2413 which was mailed on Mar. 17, 2006.

Office Action from European application No. 04030035.2-2413 which was mailed on Sep. 11, 2006.

Abbot, Mark B.; Peterson, Larry L., "Increasing Network Trhoguhput by Integrating Protocol Layers" IEEE 1993.

Wright, Maury, Low-Cost Control LANs Add Automation to Homes, Autos, and Offices EDN-Technology Jul. 20, 1992.

Preston, David J., "Internet Protocols Migrate to Silicon for Networking Devices" Electronic Design Apr. 14, 1997.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Wayner, "Sun Gambles on Java Chops", Bytes, Nov. 1996.

Raz, "Real Time Program Language Accelerator", WO 98/21655, May 1998.

Agrawal et al. "Architecture and Design of the Mars Hardware Accelerator", ACM 1987, pp. 101-107.

Case, "Implementing the Java Virtual Machine", Microprocessor Report, Mar. 1996.

Kitadeya et al., "Matsushita Launches Web TV Internet Connection Terminal", http://www.mei.co.jp/corp/news/official.data/data.dir/en981112-1/en981112-1.html, Nov. 1998.

Johnson et al. , "Internet Tuner", New Media News, http://www.newmedianews.com/020197/ts.sub-_inettuner.html, Jan. 1997.

Kelly, T., "Cheap Internet Hardware that Fits in Everything", ZDNet, http://www.zdnet.co.uk/news/1998/44/ns-5998.html, Nov. 1998.

INCITS: Development work conducted in t10-I/0 Interface-Lower Level Sep. 30, 2002 Weber, Ralph O.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Muller, Raimund, "LON—das universelle Netzwerk" Electronik 22/1991.

Rang, Michael; Tantawy, Ahmed, "A Design Methodology for Protocol Processors" IEEE 1995.

Banks, David and Prudence, Michael, "A High-Performance Network Architecture for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computer Systems, vol. 15, No. 1 Feb. 1997.

Womack, Lucas; Mraz, Ronald; Mendelson, Abraham, "A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1988.

Clark, David D.; Jacobson, Van; Romkey, John; Salwen, Howard, "An Analysis of TCP Processing Overhead" IEEE Jun. 1989.

Goloi, W.K.; Behr, P. "An IPC Protocol and Its Hardware Realization for a High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Bonjour, Dominique; de Hauteclocque, Gaelle; le Moal, Jacques, "Design and Application of ATM LAN/WAN Adapters" IEEE 1998.

Steenkiste, Peter, "Design, Implementation, and evaluation of a Single-copy Protocol Stack" Software—Practice and Experience, vol. 28, Jun. 1998.

Meleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.

Mora, F.; Sebastia, A., "Electronic Design of a High Performance Interfacce to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.

Mansour, Mohammad; Kayssi, Ayman, "FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Organization of a High-Performance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Wright, Maury "Intelligent Ethernet Boards" EDN Jun. 23, 1988.

Preston, David "Intetnet Protocols Migrate to Silicon for Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurments of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.

Maly, K.; Khanna, K.; Kukkamala, R.; Overstreet C.M.; Yerraballi, R.; Foundriat, E.C.; Madan, B., "Parallel TCP/IP for Multiprocessor Workstations" High Performance Networking, IV, 1993 IFIP.

Laskman, T.V.; Madhow, U., "Performance Analysis of Window-based Flow Control using TCP/IP:Effect of High Bandwidth Delay Products and Random Loss" High Performance Networking V. 1994 IFIP.

Ramakrishnan, K.K., "Performance Considerations in Designing Network Interfaces" IEEE Journal1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the Shrimp Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, IIija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" EEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

Luijten, Ronald P., "An OC-12 ATM Switch Adapter Chipset" 1998 IEEE.

8802-3:2000 ISO/IEC Information Technology - LAN/MAN, Part 3: Carrier Sense Multiple Access with Collision Detection, Jan. 2001 (1 page).

Office Action from the State Intellectual Property Office (SIPO) for Chinese Patent Application No. 200410104981.0, dated Jul. 17, 2009 (8 pages).

Moldeklev, K. et al., The effect of end system hardware and software on TCP/IP throughput performance over a local ATM network, Telektronikk, 1995, vol. 91, No. 2-3, pp. 155-167 (11 pages).

Rutsche, E., The Architecture of a Gb/s Multimedia Protocol Adapter, ACM SIGCOMM Computer Communication Review, Jul. 1993, vol. 23 issue 3, pp. 59-68 (10 pages).

Storage Networking Industry Association, iSCSI Building Blocks for IP Storage Networking, Leveraging High-Speed iSCSI Adapters, A SNIA IP Storage Forum Whitepaper (12 pages).

Stevens, W. R., TCP/IP Illustrated, vol. 1: The Protocols, Jan. 10, 1994, pp. 1-5, 9-10 and 26 (10 pages).

Mueller, R., Lon - dao universelle Netzwerk Teil 1, Ein neuartiges Konzept, um Steuergerate, Sensoren und Aktoren miteinander "sprechen" zu lassen, Oct. 29, 1991, vol. 40, No. 22 (8 pages).

Press, W. H. et al., Less-Numerical Algorithms, Numerical Recipes in FORTRAN 77: The Art of Scientific Computing, Sep. 25, 1992, vol. 1, pp. 888-895 (8 pages).

Chiswell, D., Implementation Challenges for 155Mbit ATM Adapters, WESCON/'95, Nov. 7-9, 1995, San Francisco, pp. 433-436 (4 pages).

Kim, C. et al., Design and Implementation of a High-Speed ATM Host Interface Controller, Proceedings of the 13th International Conference on Information Networking, 1998 (4 pages).

Varada, S. et al., Data and Buffer Management in ATM Systems, Proceedings of the 23rd Annual Conference on Local Computer Networks, LCN '98, Oct. 11-14, 1998 (9 pages).

Doumenis, Gr. A. et al. A Personal Computer Hosted Terminal Adapter for the Broadband Integrated Service Digital Network and Applications, Second International Conference on Broadband Services, Systems, and Networks, Nov. 3-4, 1993, pp. 6-10 (5 pages).

* cited by examiner

CONNECTION MANAGEMENT SYSTEM AND METHOD FOR A TRANSPORT OFFLOAD ENGINE

FIELD OF THE INVENTION

The present invention relates to managing network communications, and more particularly to network connection management.

BACKGROUND OF THE INVENTION

Prior art FIG. 1 illustrates a method 100 by which network communications are established, in accordance with the prior art. Network communications (i.e. Internet communications, etc.) utilizing various protocols (TCP, etc.) often begin with an effort to establish a connection.

When a TCP connection attempt begins, a destination host receives a synchronize (SYN) packet from a source host, as indicated in operation 102. In response to receiving such SYN packet, a designated memory, typically of finite size, is allocated to track the establishment of the connection. Note operation 103.

Thereafter, in operation 104, the destination host sends back a SYN acknowledgement packet (SYN/ACK). The destination host must then wait for receipt of a handshake ACK before the connection is established, as set forth in decision 106. This is typically referred to as the "TCP three-way opening handshake."

While waiting for the handshake ACK, the memory of finite size on the destination host keeps track of other connections waiting to be completed. This queue typically empties quickly since the handshake ACK is expected to arrive a few milliseconds after the SYN/ACK packet is transmitted.

Upon receipt of the handshake ACK, the connection is open and the associated portion of the finitely sized memory is used for tracking and maintaining the now open connection. Note operation 110. On the other hand, if the handshake ACK is not received within a predetermined timeout period (note decision 108), a test is made to determine if the maximum number of SYN/ACK retransmissions has occurred (note decision 112). If the maximum number of retransmissions has not yet occurred, the SYN/ACK packet is retransmitted. Note operation 114. If the maximum number of retransmissions has occurred, the process is ended and the memory is de-allocated. Note operation 116.

A denial-of-service (DoS) attack exploits this design by having an attacking source host generate TCP SYN packets with random source IP addresses and source ports toward a victim destination host. The victim destination host then sends a SYN/ACK packet back to the random source address (in accordance with operation 104 of the method 100 of FIG. 1) and adds an entry to the connection queue of the memory.

Since the SYN/ACK packet is destined for an incorrect or non-existent host, the last part of the "three-way opening handshake" is never completed, the memory remains allocated to the connection attempt, and the entry remains in the connection queue until the maximum number of retries has been transmitted and the timer expires, typically for about one minute. By generating phony TCP SYN packets from random addresses at a rapid rate, it is possible to fill up the connection queue of the memory and deny TCP services (such as e-mail, file transfer, WWW, etc.) to legitimate users.

There is no easy way to trace the originator of the attack because the IP address of the source is typically forged. There is thus a need for a more effective technique of managing network connection attempts in a manner that avoids the ramifications of network overload due to these and other factors.

SUMMARY OF THE INVENTION

A system and method are provided for establishing network connections. Initially, an attempt to establish a connection on a network is identified. A portion of memory is then allocated for storing data associated with the connection.

In one embodiment, the portion of the memory may be overwritten if a second attempt to establish a connection has at least one aspect associated with the previous attempt. Such aspect may include any aspect of the connection including, but not limited to an IP address, a TCP port, etc.

Optionally, each attempt to establish the connection on the network may be identified utilizing a packet [i.e. a synchronize (SYN) packet, etc.]. Still yet, the system and method may respond to the packet with a synchronize/acknowledgment (SYN/ACK) packet.

In another embodiment, a hash may be generated in association with each packet corresponding with an attempt to establish the connection on the network. Such hash may, in turn, be utilized to determine whether the second attempt to establish the connection has at least one aspect associated with the previous attempt, in the aforementioned manner.

Still yet, the hash may serve as a pointer to the data stored in the portion of the memory, where the data includes a control block. Optionally, a plurality of control blocks associated with connections in the half open state may be smaller in size with respect to a plurality of control blocks associated with open connections. Further, the control block may include a handle used to identify the connection, IP addresses, port numbers, a timestamp, etc. A half open state is defined as a connection attempt where the first SYN has at least been received from a remote host, but the corresponding handshake ACK has not yet been received.

In still yet another embodiment, the memory may include a first memory for being allocated for the data associated with half open connections. Moreover, a second memory logically or physically separate from the first memory may be allocated for data associated with open connections so that an overload of the first memory does not affect the open sockets. Optionally, as mentioned previously, the second memory may be allocated for a second-type of control block that is larger in size with respect to a first-type of control block for which the first memory is allocated.

In use, the portion of the memory may be de-allocated, upon receipt of a handshake ACK of the connection attempt. Still yet, a portion of another memory (i.e. the second memory, etc.) may be allocated for an open connection, upon the connection attempt being successful.

BRIEF DESCRIPTION OF THE DRAWINGS

Prior art

DETAILED DESCRIPTION

Figure 1:
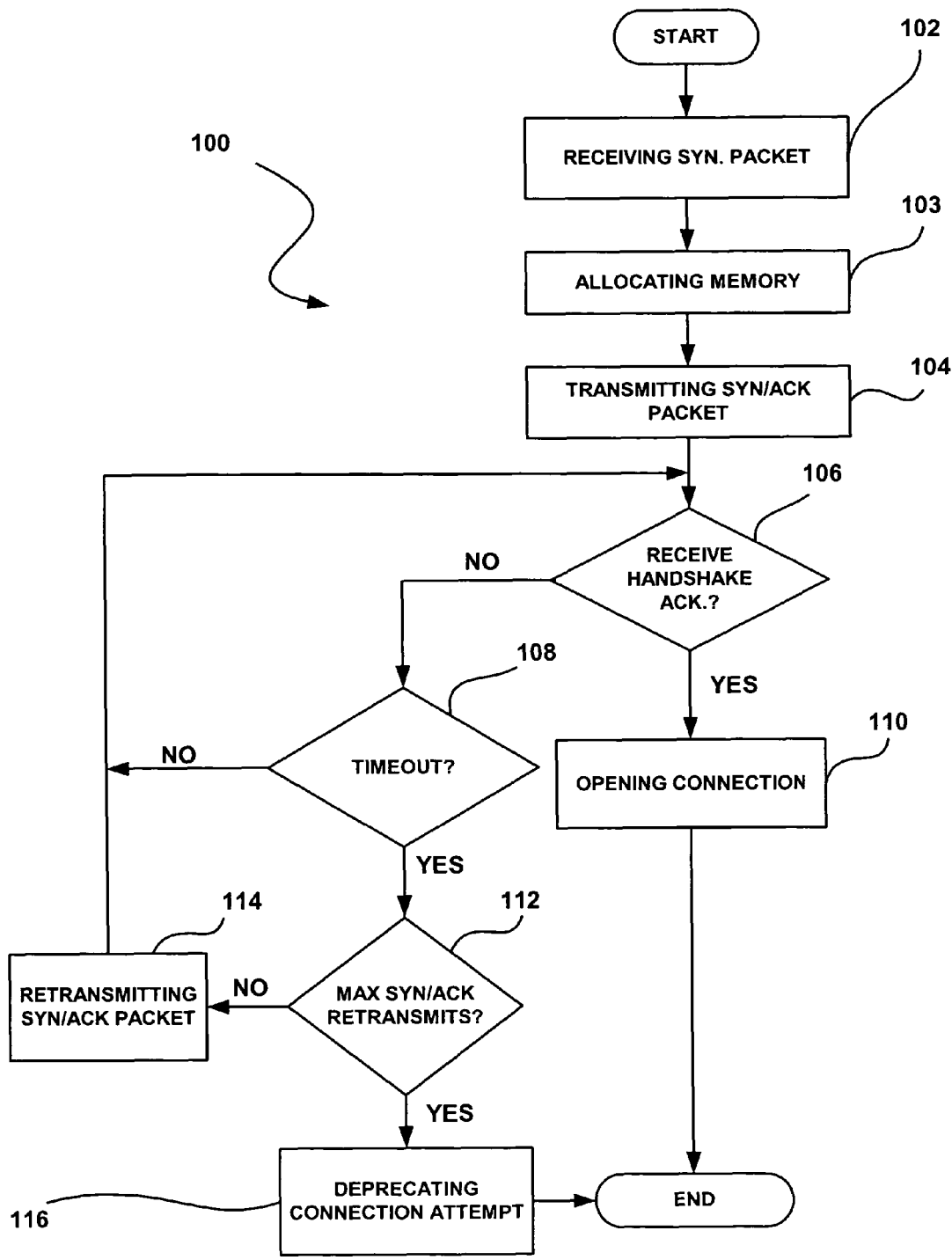
FIG. 1 illustrates a method by which network communications are established, in accordance with the prior art.
Figure 2:
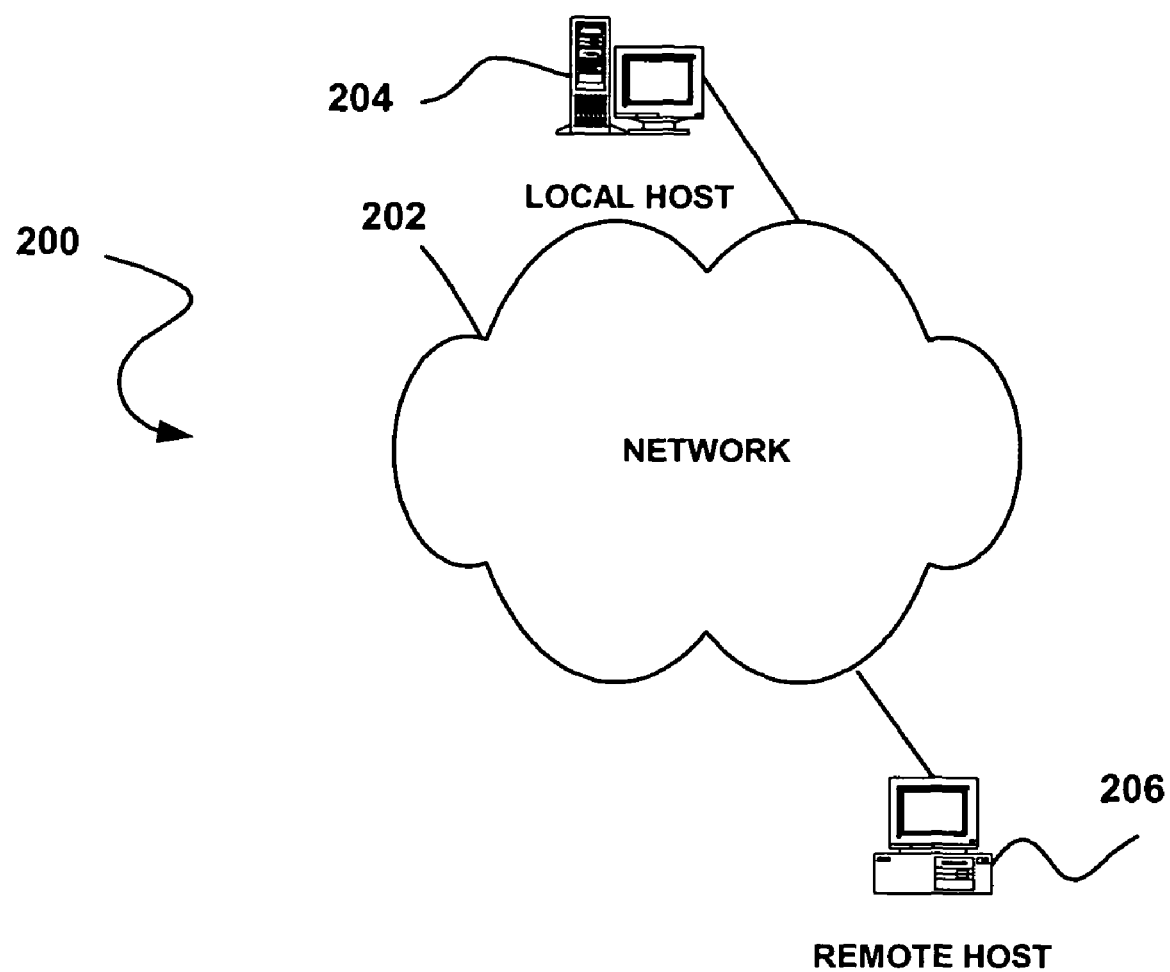
FIG. 2 illustrates a network system, in accordance with one embodiment.

FIG. 2 illustrates a network system 200, in accordance with one embodiment. As shown, a network 202 is provided. In the context of the present network system 200, the network 202 may take any form including, but not limited to a local area network (LAN), a wide area network (WAN) such as the Internet, etc.

Coupled to the network 202 are a local host 204 and a remote host 206 which are capable of communicating over the network 202. In the context of the present description, such hosts 204, 206 may include a web server, desktop computer, lap-top computer, hand-held computer, printer or any other type of hardware/software. It should be noted that each of the foregoing components as well as any other unillustrated devices may be interconnected by way of one or more networks.

Figure 3:
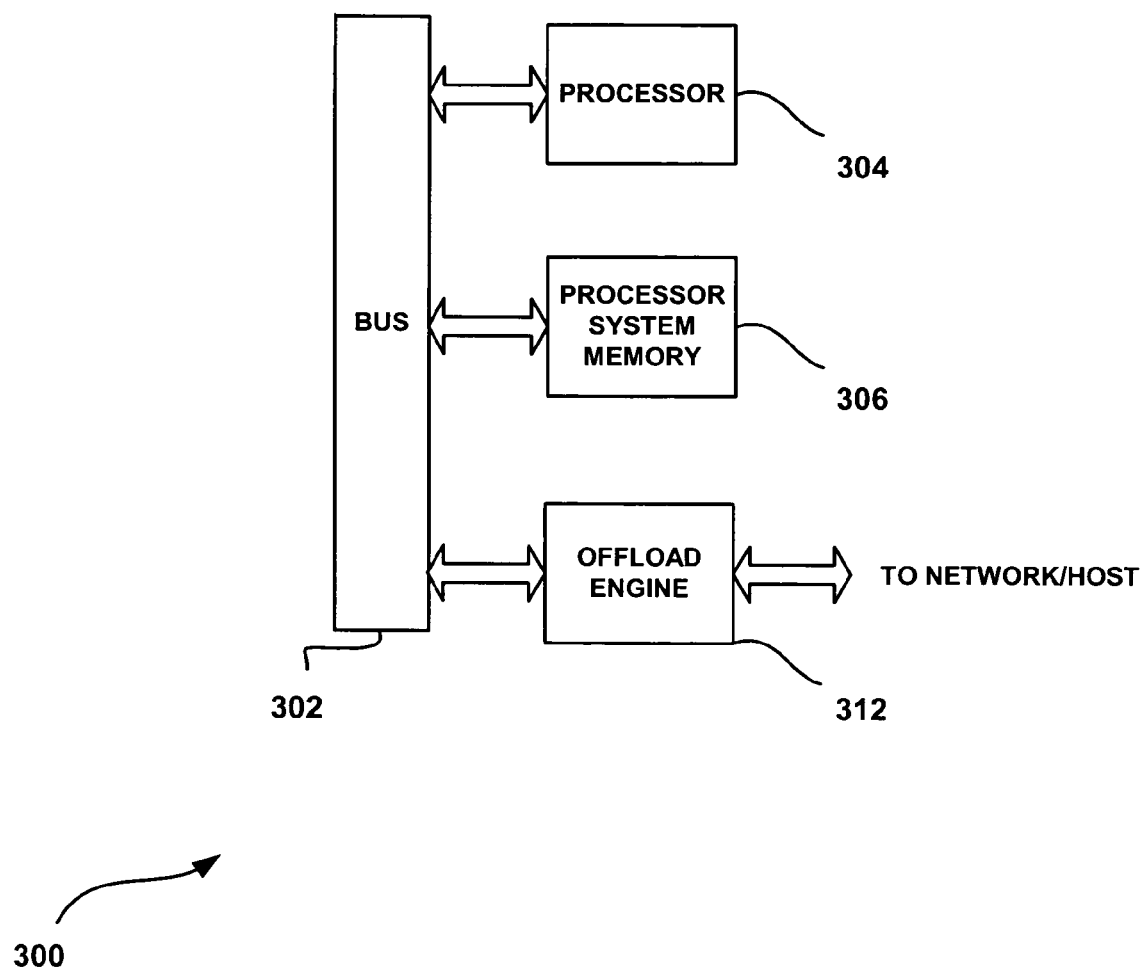
FIG. 3 illustrates an exemplary architecture in which one embodiment may be implemented.

FIG. 3 illustrates an exemplary architecture 300 in which one embodiment may be implemented. In one embodiment, the architecture 300 may represent one of the hosts 204, 206 of FIG. 2. Of course, however, it should be noted that the architecture 300 may be implemented in any desired context.

For example, the architecture 300 may be implemented in the context of a general computer system, a circuit board system, a game console system dedicated for entertainment purposes, a set-top box, a router, a network system, a storage system, an application-specific system, or any other desired system associated with the network 202.

As shown, the architecture 300 includes a plurality of components coupled via a bus 302. Included is at least one processor 304 for processing data. While the processor 304 may take any form, it may, in one embodiment, take the form of a central processing unit (CPU), a chipset (i.e. a group of integrated circuits designed to work and sold as a unit for performing related functions, etc.), or any other desired processing device(s) capable of processing data.

Further included is processor system memory 306 which resides in communication with the processor 304 for storing the data. Such processor system memory 306 may take the form of on or off-board random access memory (RAM), a hard disk drive, a removable storage drive (i.e., a floppy disk drive, a magnetic tape drive, a compact disk drive, etc.), and/or any other type of desired memory capable of storing the data.

In use, programs, or control logic algorithms, may optionally be stored in the processor system memory 306. Such programs, when executed, enable the architecture 300 to perform various functions. Of course, the architecture 300 may simply be hardwired.

Further shown is an offload engine 312 in communication with the processor 304 and the network (see, for example, network 202 of FIG. 2). In one embodiment, the offload engine 312 may remain in communication with the processor 304 via the bus 302. Of course, however, the offload engine 312 may remain in communication with the processor 304 via any mechanism that provides communication therebetween. The offload engine 312 may include a transport (i.e. TCP/IP) offload engine (TOE), or any integrated circuit(s) that is capable of managing the data transmitted in the network.

During operation, the offload engine 312 serves to work in conjunction with the processor 304 for establishing network connections while avoiding ramifications of memory overload [i.e. due to network denial-of-service (DoS) attacks, heavy traffic, etc.]. To accomplish this, an attempt to establish a connection on a network is initially identified. A portion of memory is then allocated for storing data associated with the connection. In the context of the remaining description, such memory may include any of the memory mentioned hereinabove (i.e. memory 306, etc.), memory associated with the offload engine 312, or absolutely any other memory associated with the architecture 300 and/or the network system 200.

During use, the aforementioned portion of the memory may be overwritten for the specific purpose of avoiding memory overload. It should be noted that the aforementioned functionality may be carried out in any desired manner that is capable of avoiding memory overload. More information will now be set forth regarding an exemplary method by which the offload engine 312 overwrites memory in the foregoing manner.

Figure 4A:
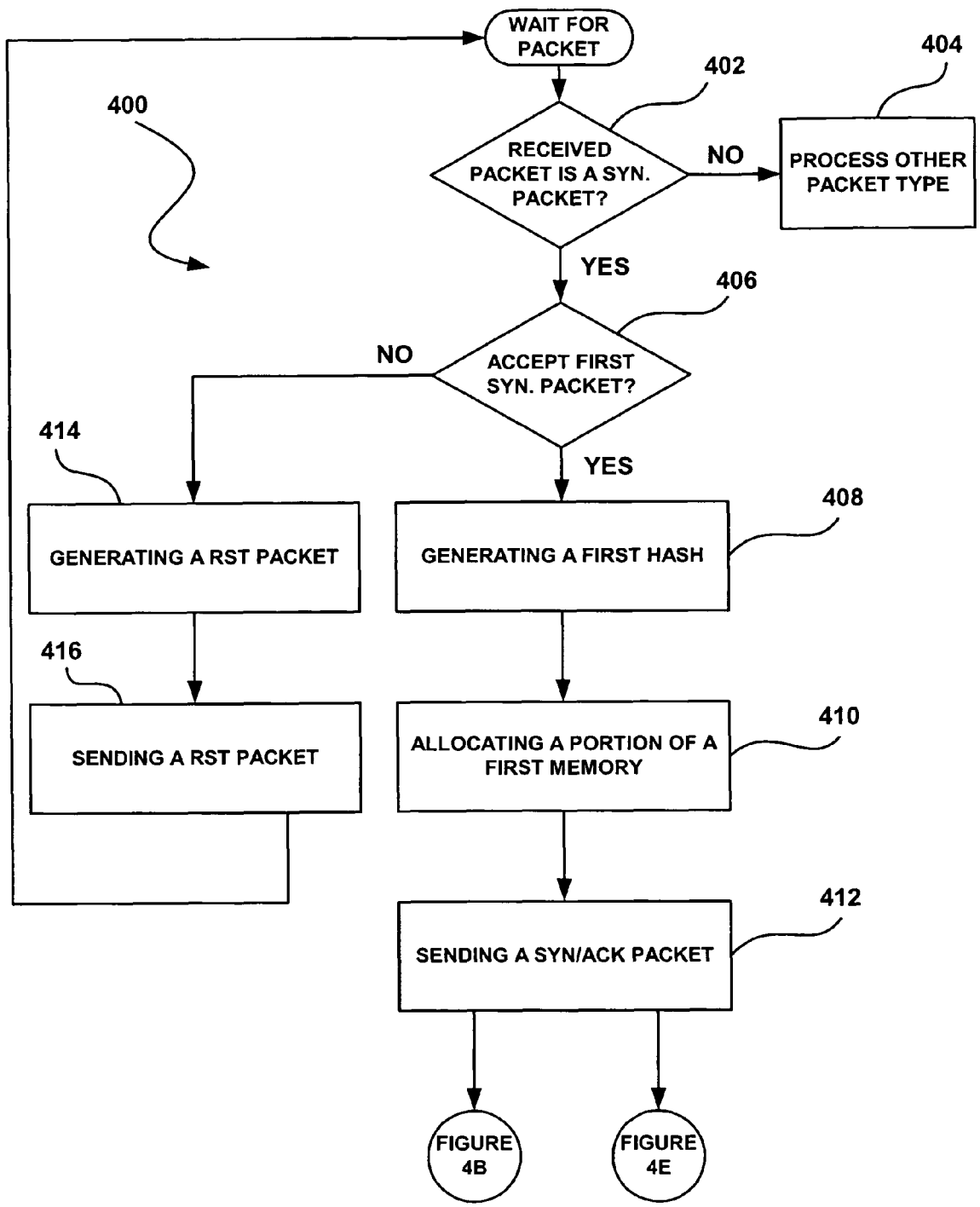
FIG. 4A illustrates an exemplary method for establishing network connections while avoiding ramifications of memory overload, in accordance with one embodiment.

FIG. 4A illustrates an exemplary method 400 for establishing network connections while avoiding ramifications of memory overload, in accordance with one embodiment. As an option, the method 400 may be carried out in the context of the exemplary architecture 300 of FIG. 3 and the network system 200 of FIG. 2. Of course, however, it should be noted that the method 400 may be implemented in any desired context. Moreover, while various functions may be attributed to exemplary components (i.e. like those set forth hereinabove), it is important to understand that the various functionality may be carried out by any desired entity.

Initially, in decision 402, it is determined whether a first synchronize (SYN) packet associated with a server socket is received by an offload engine (i.e. see, for example, offload engine 312 of FIG. 3) at a local host (i.e. see, for example, local host 204 of FIG. 2). In the context of the present description, a SYN packet may include any packet, signal, etc. that initiates the synchronization process necessary to establish a connection. In use, SYN packets may be marked by a flag within the packet. Moreover, a server socket is one endpoint of a two-way communication link between two programs running on a network. A socket may be bound to a port number so that a TCP layer can identify an application that data is destined to be sent.

If a SYN packet is not received per decision 402, the other packet type is processed in operation 404. If so, however, it is determined by a processor (i.e. see, for example, processor 304 of FIG. 2) of the local host whether the first SYN packet is to be accepted. Note decision 406. It should be noted that the above decision may be carried out based on a destination port associated with the SYN packet, and/or an interface on which the SYN packet was received.

Alternatively, the decision 406 to accept the first SYN packet may be made solely by the offload engine. The above decision may again be carried out based on a destination port associated with the SYN packet, and/or an interface on which the SYN packet was received.

If it is determined that the first SYN packet is not to be accepted, a reset (RST) packet is generated. Note operation 414. A RST packet is then transmitted back to the remote host which originated the first SYN packet. Note operation 416. Method 400 then resets. If, however, it is determined that the first SYN packet is to be indeed accepted, a first hash is created in operation 408 based on the parameters received in the first SYN packet. In the context of the present description, the hash may include a string of characters that is a shorter fixed-length value or key that represents the original string (i.e., in this case, the IP addresses and Port numbers in the first SYN packet). It should be noted that the hash may further include any identifier associated with at least one aspect of the first SYN packet. For example, the hash may be generated based on a pair of Internet Protocol (IP) addresses and ports associated with the first SYN packet.

Next, in operation 410, a first portion of a first memory is allocated for the server socket for a first-type of control block (i.e. a "half open" control block or HO-CB). Again, such memory may include any of the memory mentioned hereinabove (i.e. memory 306 of FIG. 3, etc.), memory associated with the offload engine, or absolutely any other memory associated with the architecture 300 and/or the network system 200.

In the context of the present description, the control block may include any information capable of being used to track a connection attempt and/or connection. Moreover, the first-type of control block, in particular, may include any information capable of being used to track a connection attempt. Just by way of example, the first-type of control block may include a handle, IP addresses, port numbers, a timestamp, and/or any information associated with the SYN packet.

In order to initiate the aforementioned allocation operation 410, the processor may issue an instruction block (IB) to the offload engine for the purpose of providing the information necessary to generate the first-type of control block. Given this IB, the offload engine is capable of allocating the first portion of the first memory in the foregoing manner. As will soon become apparent, the hash may be utilized as a pointer to the first-type of control block.

Alternatively, the offload engine itself may make the decision to accept the connection in the first SYN packet, and may obtain all the necessary information from the received first SYN packet and memory sources to generate the first-type of control block. The offload engine is then capable of allocating the first portion of the first memory in the foregoing manner.

With the memory allocated for the first-type of control block, the offload engine subsequently sends a synchronize acknowledgement (SYN/ACK) packet for the first SYN packet. Note operation 412. Such SYN/ACK packet may take the form of any signal that indicates that the first SYN packet has been received and that synchronization back to the remote host has been requested. Thereafter, the local host awaits the final component of the "TCP three-way opening handshake," the handshake ACK, which may take the form of any signal that acknowledges the receipt of the SYN/ACK packet at the remote host.

Figure 4B:
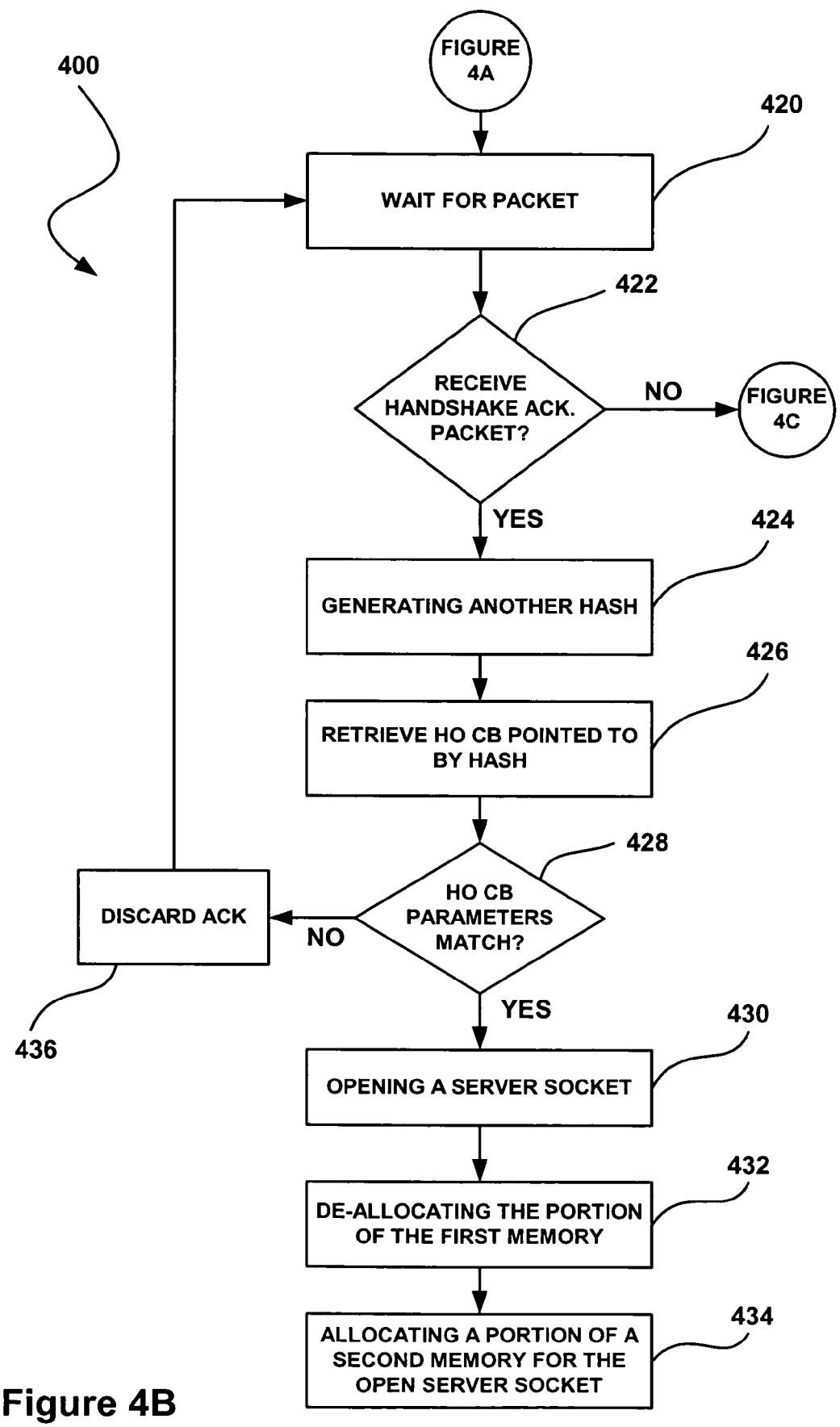
FIG. 4B illustrates a network connection establishment method in a case where a handshake acknowledgement (ACK) is received in response to the first synchronize (SYN) packet ACK of FIG. 4A, in accordance with one embodiment.
Figure 4C:
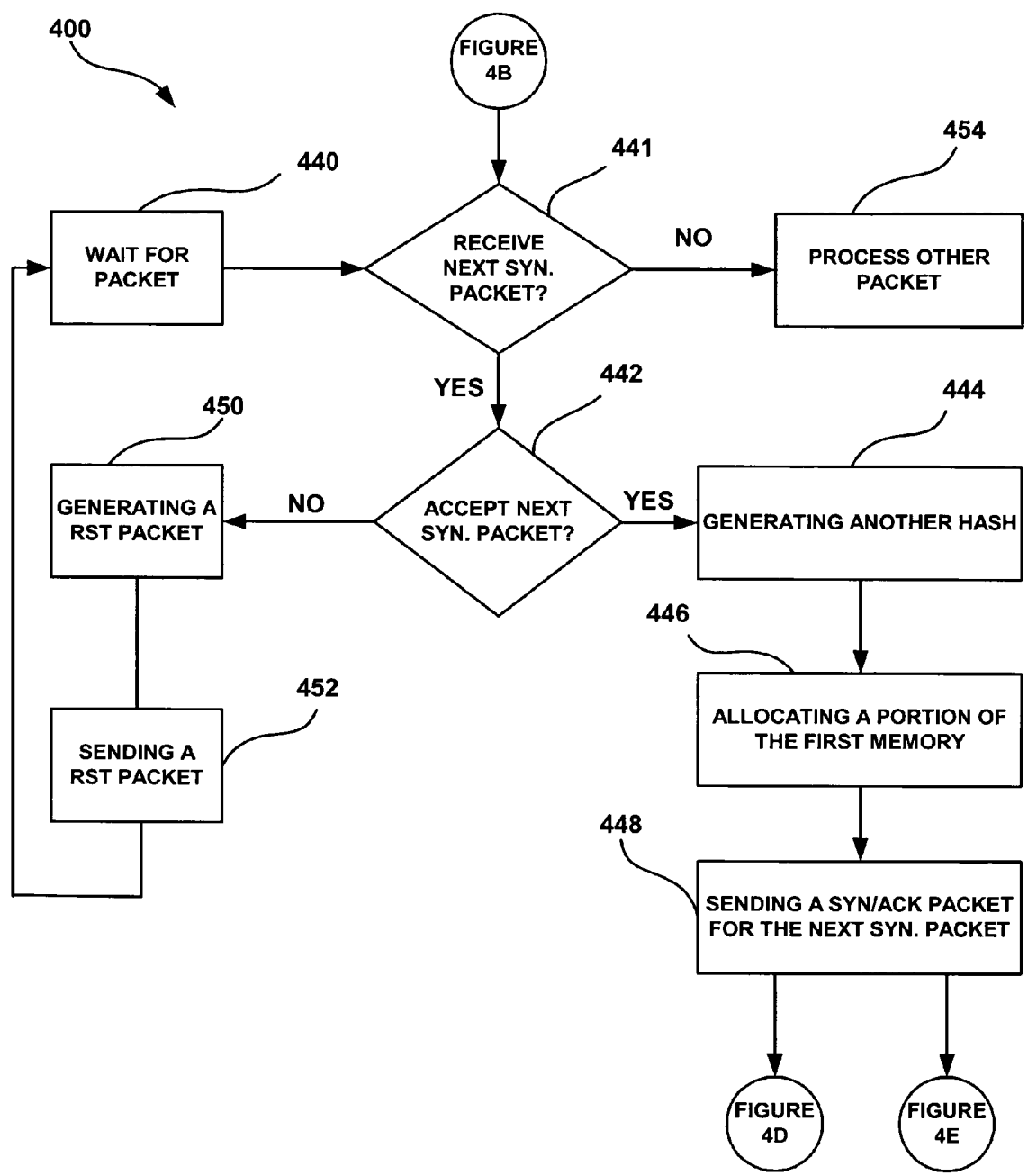
FIG. 4C illustrates a network connection establishment method in a case where another SYN packet is received after the first SYN packet of FIG. 4A, but before the handshake ACK is received in response to the first SYN/ACK packet.
Figure 4D:
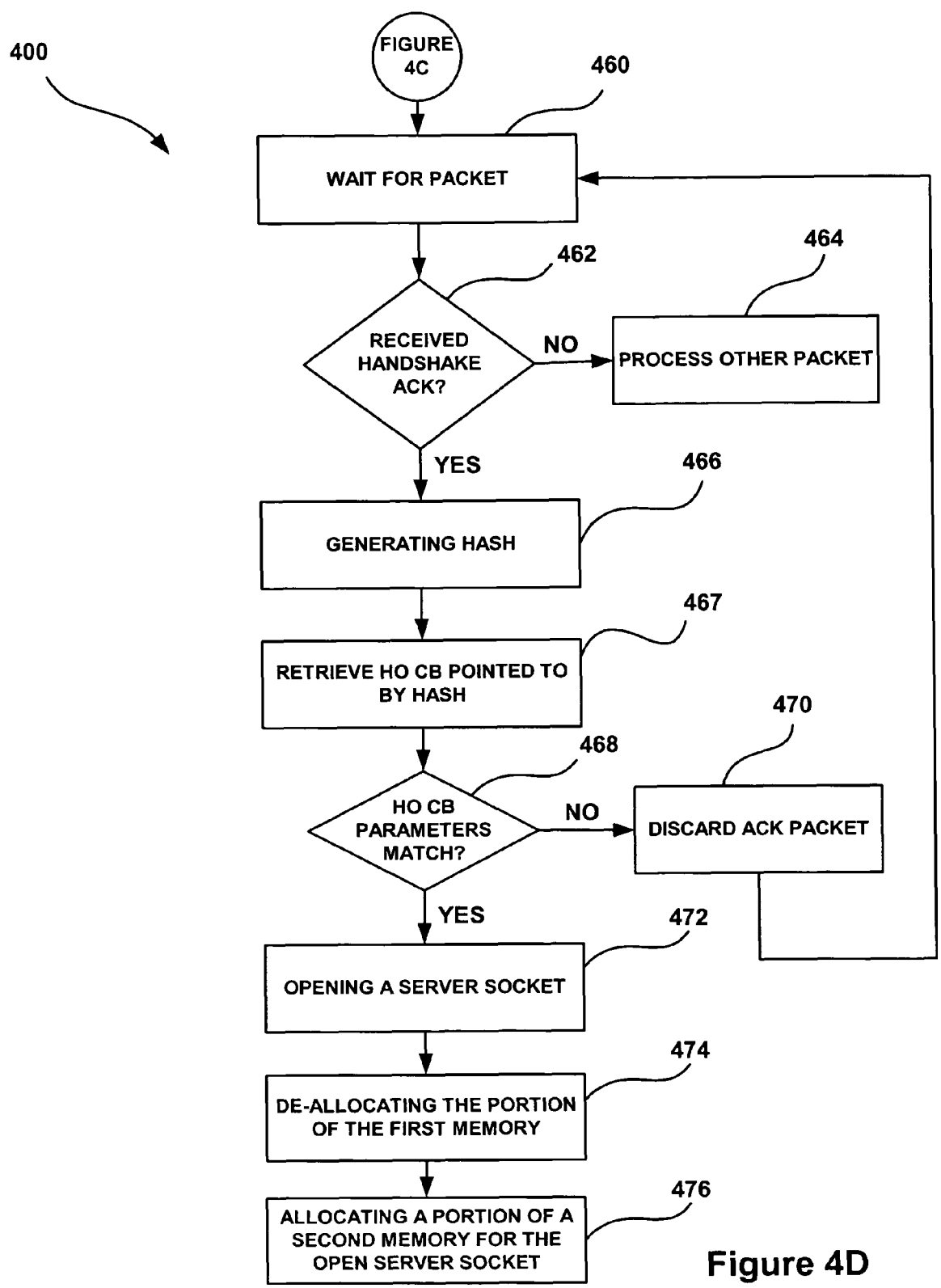
FIG. 4D illustrates a continuation of the network connection establishment method of FIG. 4C, in accordance with one embodiment.
Figure 4E:
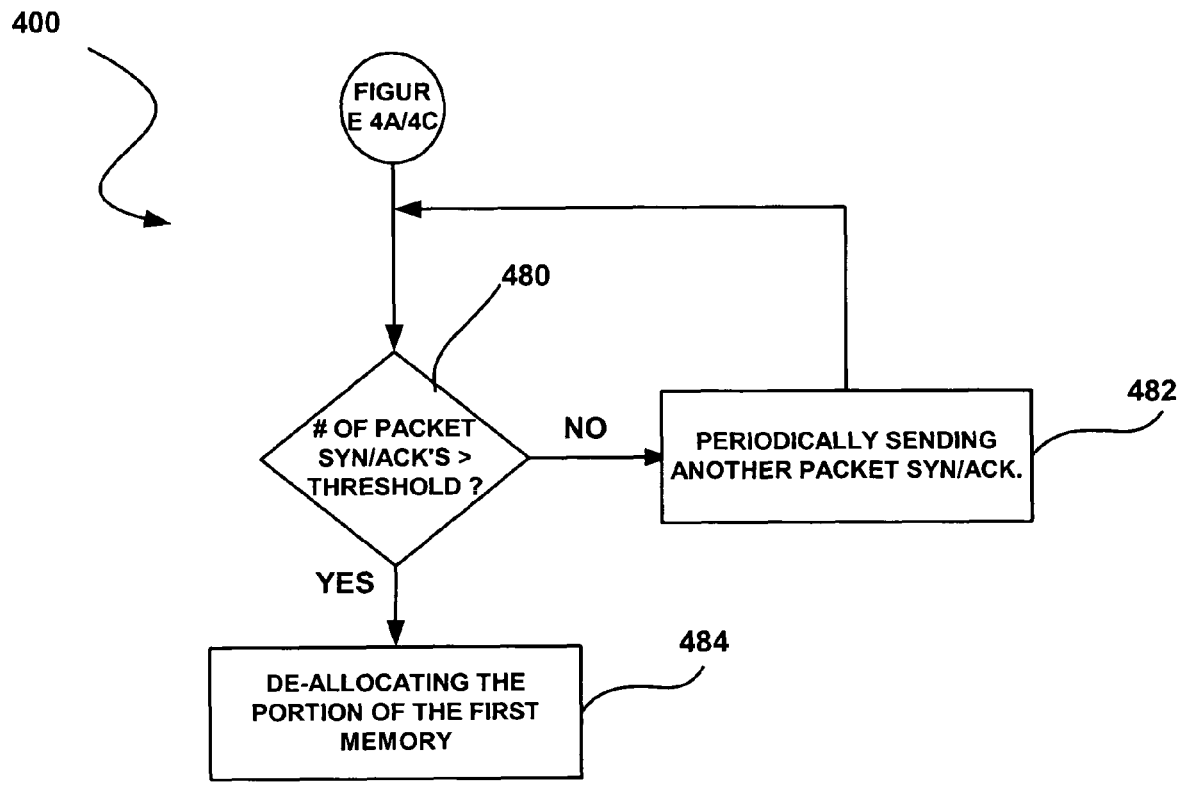
FIG. 4E illustrates a network connection establishment method in a case where no further handshake ACKs or other SYN packets are received for the connection attempt.

At this point, the functionality of the method 400 varies based on whether the handshake ACK is received, another SYN packet is received, or neither is received. The following figures are allocated to describe each of the foregoing case scenarios. For example, FIG. 4B illustrates a network connection establishment method in a case where a handshake ACK is received in response to the first SYN/ACK packet of FIG. 4A, in accordance with one embodiment. Moreover, FIGS. 4C and 4D illustrate a network connection establishment method in a case where another SYN packet is received after the first SYN packet of FIG. 4A, but before the handshake ACK is received in response to the first SYN/ACK packet. Still yet, FIG. 4E illustrates a network connection establishment method in a case where neither a handshake ACK nor another SYN packet is received.

Similar to before, the methods of FIGS. 4B-4E may be carried out in the context of the method 400 of FIG. 4, in association with the exemplary architecture 300 of FIG. 3 and the network system 200 of FIG. 2. Of course, however, it should be noted that the methods of FIGS. 4B-4E may be implemented in any desired independent context. Moreover, while various functions may be attributed to exemplary components (i.e. like those set forth hereinabove), it is important to understand that the various functionality may be carried out by any desired entity.

With reference first to FIG. 4B, it is determined by the offload engine, after waiting for a packet in operation 420, whether the packet received is an ACK packet. Note decision 422. If the packet is not an ACK packet, further checks are done to see what type of packet was received. See FIG. 4C. If the received packet is an ACK packet, a hash is generated, as indicated in operation 424. Such hash may be generated in a manner similar, if not identical, to that set forth hereinabove regarding the SYN packet. For example, the hash may be generated based on a pair of IP addresses and ports associated with the handshake ACK packet.

Parameters in the first-type control block (i.e. a HO-CB) as identified by the hash of the received ACK packet are then retrieved, as indicated in operation 426. The parameters retrieved from the aforementioned HO-CB are then used to determine if the received ACK is the handshake ACK. If it is, then the parameters in the HO-CB are compared to those received in the handshake ACK packet to see if the received handshake ACK packet belongs to the same connection attempt as stored in the identified HO-CB. See decision 428. If the parameters do not match, the received handshake ACK is discarded, as indicated by operation 436, and the method 400 resets back to waiting for received packets. If the parameters do match, it is then confirmed that the final component of the "TCP three-way opening handshake" is complete. To this end, the server socket is opened to produce an open socket. See operation 430.

Moreover, in order to free up the first memory for tracking additional connection attempts, the portion of the first memory that was previously allocated for the first SYN packet is now de-allocated. Note operation 432. By this de-allocation, the first-type of control block is invalidated.

To facilitate the opening, the parameters read from the HO-CB in operation 426 are used to generate a second-type of control block (i.e. an Open Control Block or Open CB). See operation 434. The Open CB is used to track the state of the now open connection. Similar to the first-type of control block, the second-type of control block may include any information capable of being used to track and maintain an open connection. However, since more information is often required to track open connections, the second-type of control block is larger in size than the first-type of control block.

Moreover, the second memory which stores the second-type of control block may include any of the memory mentioned hereinabove (i.e. memory 306 of FIG. 3, etc.), memory associated with the offload engine, or absolutely any other memory associated with the architecture 300 and/or the network system 200. It should be noted, however, that the second memory is logically (and possibly even physically, in addition to logically) maintained separate, or independent, from the first memory such that overload of the first memory (i.e. due to an excessive number of connection attempts, attacks, etc.) does not affect the tracking of the open connections by the second memory. Since the second-type of control block is larger in size than the first-type of control block, the second memory may accommodate this by being larger in size than the first memory.

As mentioned previously, if the appropriate handshake ACK is not received (as determined in decisions 422 of FIG. 4B), it is then determined whether another SYN packet is received.

With reference now to FIG. 4C, it is first determined whether another SYN packet is received by the offload engine. Note decision 441. If another SYN packet is not received per decision 441, the other packet type is processed in operation 454. If so, however, similar to decision 406 of FIG. 4A, it is then determined whether the next SYN packet is to be accepted in decision 442. As noted for the first received SYN packet, the decision to accept the second received SYN packet may be made by the local host or by the offload engine. If the second received SYN packet is not accepted, a RST packet is generated, as indicated by operation 450, and transmitted to the remote host that originated the second received SYN packet. See operation 452. The method 400 then resets back to wait for the next packet as indicated by operation 440.

If the second received SYN packet is accepted by decision 442, a hash is generated for the aforementioned SYN packet, as indicated by operation 444. If the hash generated in operation 444 differs from the hash generated for the first received SYN packet, a different portion of the first memory is allocated to the second received SYN packet. See operation 446.

If the hash generated in operation 444 coincides with the hash generated for the first received SYN packet, the portion of memory allocated in the first memory for the first received SYN packet will be overwritten by the connection parameters for the second received SYN packet in operation 446. In other words, the parameters of the overwritten control block associated with the first SYN packet may be replaced with those of the second SYN packet in the case of a hash collision.

In cases where the second SYN packet is a retransmitted SYN packet by a remote host, the parameters are not overwritten in the CB since the second SYN packet is for the same connection attempt. When the hashes for received SYNs coincide, either the first or second received SYN packet (or both) may be a component of an attack, or it may be caused by the remote host retransmitting a SYN packet. If more and more SYN packets are received without connections completing the "TCP three-way opening handshake", the first memory is at risk of being overloaded. In any case, allowing subsequently received accepted SYN packets whose hash values coincide with previously received SYN packets to overwrite the corresponding portion of the first memory ensures that the first memory will not be overloaded.

Regardless of whether the hash for the second received SYN packet coincided with the first received SYN packet, if the SYN packet is accepted, a SYN/ACK packet is generated and transmitted back to the remote host that originated the second received SYN packet, as indicated in operation 448.

With reference now to FIG. 4D, the method 400 continues from FIG. 4C to accommodate the next packet by waiting for the same in operation 460. In particular, it is first determined whether the handshake ACK for a SYN packet has been received. Note decision 462. If it is not a handshake ACK, the method processes the received packet accordingly, as indicated in operation 464.

If, however, the received packet is an ACK, a hash is generated. See operation 466. The HO-CB pointed to by the generated hash is then retrieved, as indicated by operation 468. The parameters retrieved from the HO-CB are then used to determine if the received ACK is a handshake ACK. If so, then the parameters from the handshake ACK are compared to the parameters contained within the HO-CB.

If they do not match, the ACK packet is discarded, and the process reverts back to waiting for a packet. See operation 470. This will be the case where a handshake ACK for a first SYN packet is received after a second SYN packet is received that had a hash which coincided with the first received SYN packet. In this case, the first received SYN's HO-CB parameters would have been overwritten when the second-received SYN was received. Therefore, when the handshake ACK for the first received SYN is received and the corresponding HO-CB fetched, the parameters fetched would be those of the second received SYN packet and would therefore not match the parameters of the handshake ACK for the first received SYN packet.

If the parameters fetched from the HO-CB do match the parameters in the received handshake ACK in decision 468, the process follows the same steps as outlined in FIG. 4B. Specifically, a server socket is opened in operation 472. The portion in first memory used to store the HO-CB of the connection associated with the received handshake ACK is de-allocated, as indicated in operation 474. Further, a portion in second memory is allocated to track and maintain the now open connection, as indicated in operation 476.

FIG. 4E illustrates the case where neither a handshake ACK of FIGS. 4B/4D nor another SYN packet of FIG. 4C is received. In use, additional SYN/ACK packets are periodically resent in response to SYN packets, in an effort to elicit the appropriate handshake ACK response. Note operation 482. As an option, the SYN/ACK packets can be resent based on a timestamp associated with the corresponding control block. If, after a number of SYN/ACK retransmits, no handshake ACK response is received from the peer, the offload engine may deem that the connection attempt has been aborted. See decision 480. The number of retransmits attempted may be pre-determined and/or user-configured. If the connection attempt is deemed to be aborted, the portion in first memory allocated for the connection attempt is de-allocated and free to be used for future connection attempts. See operation 484.

Figure 5:
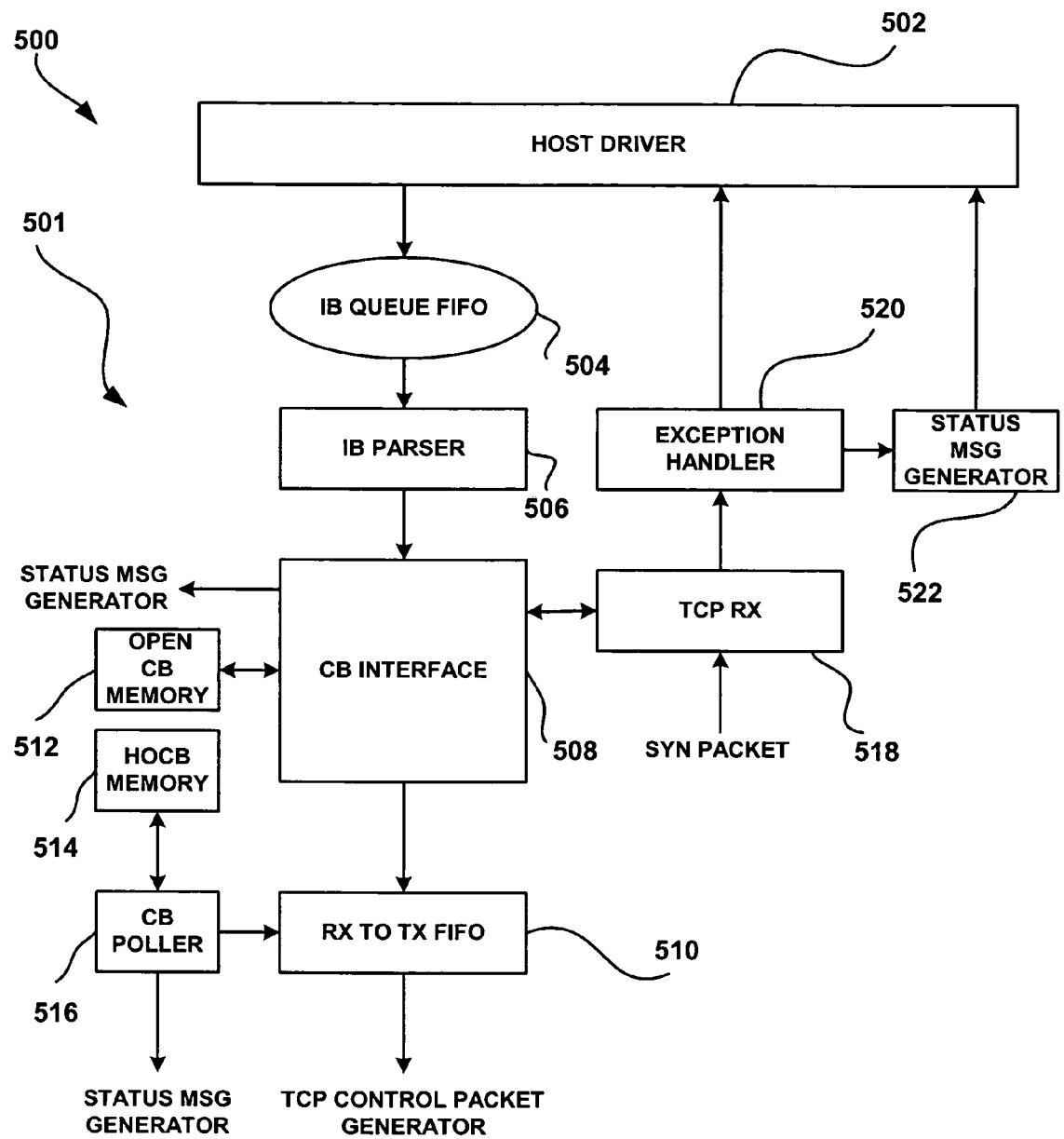
FIG. 5 illustrates an exemplary design and operation for establishing network connections while avoiding ramifications of memory overload, in accordance with an exemplary embodiment, for the case where the decision to accept SYN packets are performed by a host driver.

FIG. 5 illustrates an exemplary design and operation 500 for establishing network connections while avoiding ramifications of memory overload, in accordance with an exemplary embodiment. As an option, the design and operation 500 may be carried out in the context of the disclosure of the previous figures. Of course, however, it should be noted that the design and operation 500 may be implemented in any desired context. Most importantly, the exemplary design and operation 500 is set forth for illustrative purposes only, and should not be considered as limiting in any manner. In the context of the present description, the host driver is defined as a SW component(s) residing on the local host that works in conjunction with the offload engine.

As shown, the exemplary design and operation 500 shows a host driver 502 associated with a processor which, in turn communicates with an offload engine 501 which comprising a plurality of exemplary components. For example, the offload engine 501 is shown to include a receiver 518, an exception handler 520, a control block (CB) poller 516, an instruction block (IB) FIFO queue 504, a status message generator 522, an IB parser 506, CB memory 512/514, a CB interface 508, a first-in-first-out (FIFO) buffer 510, and a data packet generator (unillustrated), which are coupled as shown. The functionality of the various components will be set forth in greater detail hereinafter during a discussion of the use of the exemplary design and operation 500.

In use, the offload engine 501 receives a SYN packet via the receiver 518. A checksum associated with the SYN packet is then validated. If the validation succeeds, the SYN packet is sent as an exception packet to the host via the host driver 502, utilizing the exception handler 520. A status message is also generated by the status message generator 522, and sent to the host driver 502 indicating that a SYN packet has been received.

At the host, the driver 502 examines the SYN packet by reviewing the destination port, IP address, and an interface on which it was received to determine if it is associated with a connection that should be opened. If Internet protocol security (IPSEC) is being used, the protection used (or not used) may be validated in a policy table.

If the driver 502 wishes to allow the instant connection, it issues a SYNACK IB. This IB may then be hardware processed by the offload engine 501, by first being stored/queued utilizing the FIFO queue 504 and then being parsed utilizing the IB parser 506. The IB may contain all the information needed to generate a half open (HO) control block (CB) for the connection, including a CB handle to be used once the socket moves to an established state.

The offload engine 501, once it receives the SYNACK IB, may create an HO CB utilizing the interface 508 and related components, and send out a SYN/ACK packet in response to the SYN packet. When a handshake ACK is received from the remote host, the HO CB may be transferred to an open CB using the handle provided. At that point, a "socket established" status message may be generated.

If, however, the host receives another SYN packet that generates a hash that coincides with a previously received connection attempt before the previous connection reaches the established state, the previous HO CB is overwritten with the new connection attempt parameters. This provides the overload protection for the offload engine 501. A status message may be sent to the host driver 502 in this situation indicating that the CB handle used in the previous HO CB may be freed and used again. At this point, the CB poller 516 may handle SYN/ACK packet retransmissions, as necessary in the manner set forth hereinabove.

Figure 6:
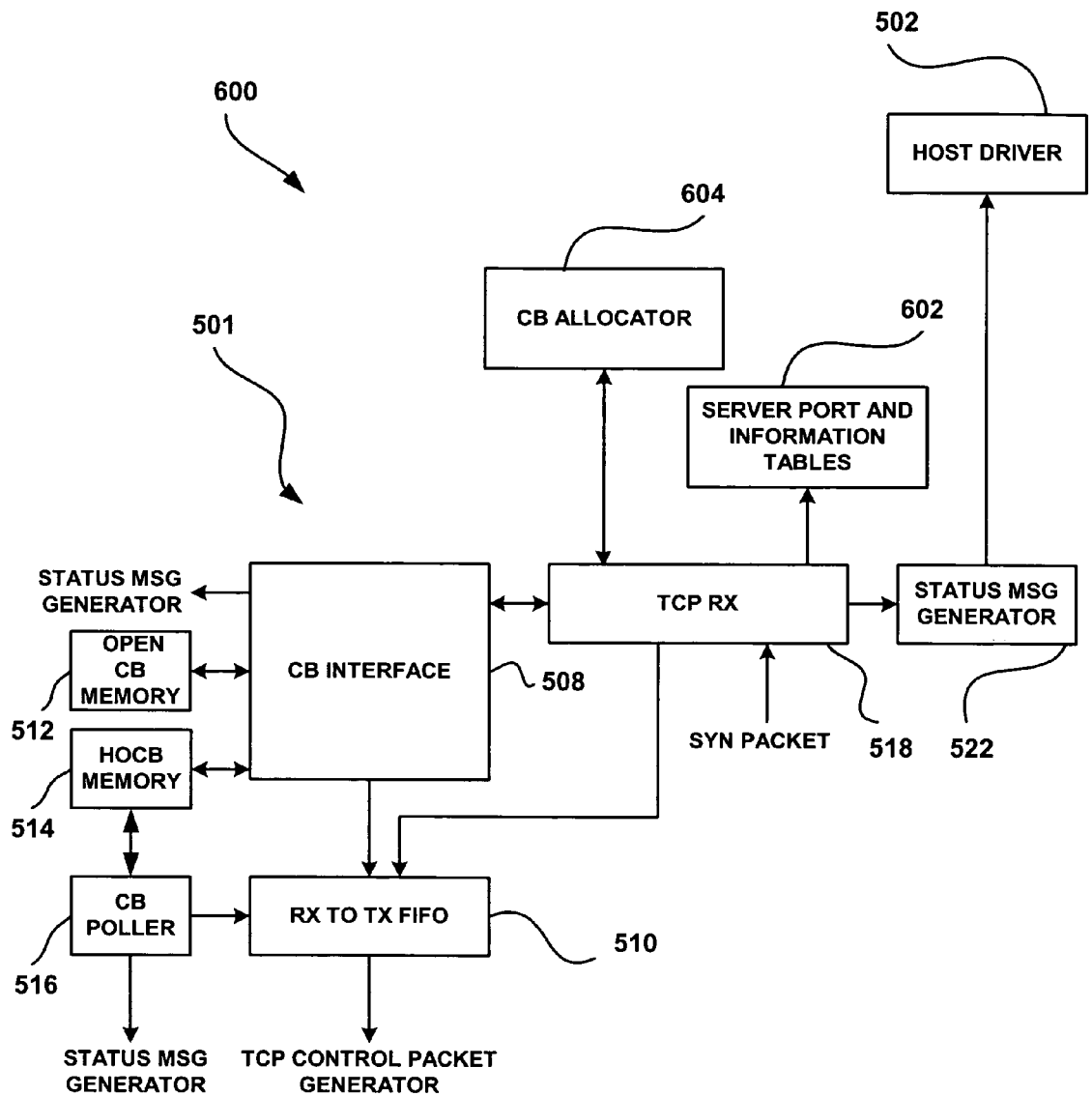
FIG. 6 illustrates an exemplary design and operation for establishing network connections while avoiding ramifications of memory overload, in accordance with an exemplary embodiment, for the case where the decision to accept SYN packets are performed by the offload engine.

FIG. 6 illustrates an alternative design and operation 600 for establishing network connections while avoiding ramifications of memory overload, in accordance with an exemplary embodiment. As an option, the design and operation 600 may be carried out in the context of the disclosure of the previous figures. Of course, however, it should be noted that the design and operation 600 may be implemented in any desired context. Most importantly, the exemplary design and operation 600 is set forth for illustrative purposes only, and should not be considered as limiting in any manner.

As shown, the exemplary design and operation 600 shows the same components as depicted in FIG. 5, with the addition of a server port and information table 602, and a CB allocator 604.

In use, the offload engine 501 receives a SYN packet via the receiver 518. A checksum associated with the SYN packet is then validated. If the validation succeeds, the TCP port specified by the SYN packet is checked in the server port and information table 602.

If the port is deemed to be authorized to accept connections, a HO-CB is created in HOCB memory 514 using the parameters received in the SYN packet and those associated with the destination port in the server port and information table 602. A SYN/ACK response is then requested by the receiver 518 via the FIFO 510. When the handshake ACK for the connection attempt is received from the remote host, the HO CB may be transferred to an open CB using a handle provided by the CB allocator 604. At that point, a "socket established" status message may be generated via the status message generator 522.

If, however, the offload engine 501 receives another SYN packet before the previous connection reaches the established state, the previous HO CB may be overwritten with the new connection attempt parameters if the hash generated by the second received SYN packet coincides with the hash of the received SYN of the previous connection attempt. This again provides the overload protection for the offload engine 501. A status message may not need to be sent to the host driver for this case, as the host driver may only care to be informed when connections are established.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for establishing network connections, comprising:
   identifying a first attempt to establish a connection on a network; and
   allocating a portion of memory for storing data associated with the connection;
   wherein the portion of the memory is overwritten, in order to avoid memory overload, if a subsequent second attempt to establish a connection has at least one aspect associated with the first attempt;
   wherein each attempt to establish the connection on the network is carried out by identifying a packet, wherein said packet is a synchronize packet;
   wherein the portion of memory is allocated for the synchronize packet, and where the portion of memory is overwritten by connection parameters for a second synchronize packet if a hash generated for the second synchronize packet has at least one aspect associated with a hash generated for the synchronize packet.

2. The method as recited in claim 1, and further comprising responding to the packet with a packet acknowledgment.

3. The method as recited in claim 1, and further comprising generating a hash associated with each packet associated with an attempt to establish a connection on the network.

4. The method as recited in claim 3, wherein the hash is utilized to determine whether subsequent attempts to establish connections have at least one aspect associated with previous attempts.

5. The method as recited in claim 4, wherein the at least one aspect includes an IP address.

6. The method as recited in claim 4, wherein the at least one aspect includes a TCP port.

7. The method as recited in claim 4, wherein the hash serves as a pointer to the data stored in the portion of the memory, and the data includes a control block.

8. The method as recited in claim 7, wherein a plurality of control blocks associated with connection attempts are smaller in size with respect to a plurality of control blocks associated with open connections.

9. The method as recited in claim 7, wherein the control block includes a handle, IP addresses, TCP ports, and a timestamp.

10. The method as recited in claim 1, wherein the memory includes a first memory for being allocated for the data associated with connection attempts.

11. The method as recited in claim 10, wherein a second memory logically separate from the first memory is allocated for data associated with open connections so that overload of the first memory does not affect the open connections.

12. The method as recited in claim 11, wherein the second memory is allocated for a second-type of control block that is larger in size with respect to a first-type of control block for which the first memory is allocated.

13. The method as recited in claim 1, and further comprising de-allocating the portion of the memory, upon receipt of a handshake acknowledgement of the first connection attempt.

14. The method as recited in claim 13, and further comprising allocating a portion of another memory for an open connection, upon the first connection attempt being successful.

15. The method as recited in claim 1, wherein the memory overload results from a denial-of-service attack.

16. The method as recited in claim 1, wherein each attempt to establish a connection on the network is processed by sending a synchronize packet to a processor to determine whether the synchronize packet is to be accepted.

17. The method as recited in claim 1, wherein each attempt to establish connection on the network is processed by utilizing an offload engine to determine whether a synchronize packet is to be accepted.

18. An offload engine sub-system for establishing network connections while avoiding ramifications of memory overload, comprising:

an offload engine for identifying a first attempt to establish a connection on a network, and allocating a portion of memory for storing data associated with the connection;

wherein the portion of the memory is overwritten to avoid overload of the memory if a subsequent second attempt to establish a connection has at least one aspect associated with the first attempt;

wherein each attempt to establish the connection on the network is carried out by identifying a packet, wherein said packet is a synchronize packet;

wherein the portion of memory is allocated for the synchronize packet, and where the portion of memory is overwritten by connection parameters for a second synchronize packet if a hash generated for the second synchronize packet has at least one aspect associated with a hash generated for the synchronize packet.

19. A system for establishing network connections while avoiding ramifications of memory overload, comprising:

a processor;

an offload engine in communication with the processor and a network via a bus, the offload engine for identifying a first attempt to establish a connection on the network, and allocating a portion of memory for storing data associated with the connection;

wherein the portion of the memory is overwritten to avoid overload of the memory if a subsequent second attempt to establish a connection has at least one aspect associated with the first attempt;

wherein each attempt to establish the connection on the network is carried out by identifying a packet, wherein said packet is a synchronize packet;

wherein the portion of memory is allocated for the synchronize packet, and where the portion of memory is overwritten by connection parameters for a second synchronize packet if a hash generated for the second synchronize packet has at least one aspect associated with a hash generated for the synchronize packet.

* * * * *